US008360286B2

(12) United States Patent
Shi et al.

(10) Patent No.: US 8,360,286 B2
(45) Date of Patent: Jan. 29, 2013

(54) DRAW BACK PUSH PUMP

(75) Inventors: Zhenchun (Tony) Shi, Hamilton (CA); Heiner Ophardt, Vineland (CA); Andrew Jones, Smithville (CA)

(73) Assignee: Gotohti.com Inc., Ontario (CA)

( * ) Notice: Subject to any disclaimer, the term of this patent is extended or adjusted under 35 U.S.C. 154(b) by 378 days.

(21) Appl. No.: 12/805,023

(22) Filed: Jul. 7, 2010

(65) Prior Publication Data

US 2011/0014076 A1 Jan. 20, 2011

(30) Foreign Application Priority Data

Jul. 14, 2009 (CA) ...................................... 2672057

(51) Int. Cl.

| | |
|---|---|
| ***B65D 88/54*** | (2006.01) |
| ***G01F 11/00*** | (2006.01) |
| ***B65D 5/72*** | (2006.01) |
| ***B65D 25/40*** | (2006.01) |
| ***B65D 35/38*** | (2006.01) |
| ***B67D 7/06*** | (2010.01) |

(52) U.S. Cl. ................. 222/321.3; 222/57.1; 222/181.3; 222/321.8

(58) Field of Classification Search ............... 222/181.3, 222/321.3, 321.8, 371, 375, 571
See application file for complete search history.

(56) References Cited

U.S. PATENT DOCUMENTS

| | | | | |
|---|---|---|---|---|
| 3,976,068 A * | 8/1976 | Lundquist | ..................... | 604/518 |
| 4,173,297 A * | 11/1979 | Pettersen | ................... | 222/321.2 |
| 4,852,772 A * | 8/1989 | Ennis, III | ....................... | 222/386 |
| 5,165,577 A * | 11/1992 | Ophardt | ..................... | 222/181.2 |
| 2007/0257064 A1 * | 11/2007 | Ophardt | ........................ | 222/251 |

* cited by examiner

*Primary Examiner* — Kevin P Shaver
*Assistant Examiner* — Matthew Lembo
(74) *Attorney, Agent, or Firm* — Thorpe North & Western LLP

(57) ABSTRACT

A piston pump dispenser having a reciprocating piston pump arrangement which in a dispensing stroke dispenses fluid from an outlet and in a charging stroke draws fluid from a reservoir and also draws back fluid from the outlet.

16 Claims, 12 Drawing Sheets

DRAW BACK PUSH PUMP

SCOPE OF THE INVENTION

Many dispensers of liquids such as hands soaps, creams, honey, ketchup and mustard and other viscous fluids which dispense fluid from a nozzle leave drops of liquid at the end of the outlet. This can be a problem in that the liquid may harden, as by creating an obstruction which reduces the area for fluid flow in future dispensing. The obstruction can result in future dispensing through a small area orifice resulting in spraying in various directions such as onto a wall or user to stain the wall or, more disadvantageously, into the eyes of a user.

Many dispensers of material such as creams and, for example, liquid honey have the problem of stringing in which an elongate string of fluid hangs from fluid in the outlet and dangles from the outlet after dispensing an allotment of fluid. With passage of time, the string may form into a droplet and drop from the outlet giving the appearance that the dispenser is leaking.

Piston pumps as for soap dispensers are known as taught in U.S. Pat. No. 5,975,360 to Ophardt issued Nov. 2, 1999.

SUMMARY OF THE INVENTION

To at least partially overcome these disadvantages of previously known devices the present invention provides a piston pump dispenser having a reciprocating piston pump arrangement which in a dispensing stroke dispenses fluid from an outlet and in a charging stroke draws fluid from a reservoir and also draws back fluid from the outlet.

The present invention is particularly applicable to fluid dispensers in which fluid is to be dispensed out of an outlet with the outlet forming an open end of a tubular member. In many applications, the tubular member has its outlet opening downwardly and fluid passing through the tubular member is drawn downwardly by the forces of gravity.

An object of the present invention is to provide a fluid dispenser in which after dispensing fluid out an outlet draws fluid back through the outlet to reduce dripping and/or stringing.

An object of the present invention is to provide a simplified piston pump for dispensing fluid and, after dispensing, draws back fluid from the outlet of a nozzle from which the fluid has been dispensed.

Accordingly, in one aspect the present invention provides a pump for dispensing liquid from a reservoir comprising:

a piston chamber-forming member having a chamber disposed about an axis, the chamber having a diameter, a chamber wall, an inner end and an outer end, the inner end of the chamber in fluid communication with the reservoir, a one-way valve mechanism between the reservoir and the chamber permitting fluid flow through the inner end of said chamber, only from the reservoir to the chamber;

a piston-forming element received in the piston chamber-forming member axially slidable inwardly and outwardly therein, said piston-forming element having an axially extending hollow stem having a central passageway closed at an inner end and having an outlet proximate an outer end, an inner disc on the stem extending radially outwardly from the stem circumferentially thereabout, an outer disc on the stem spaced axially outwardly from the inner disc and extending radially outwardly from the stem circumferentially thereabout, an inlet located on the stem between the inner disc and the outer disc in communication with the passageway, the piston-forming element slidably received in the piston chamber-forming member for reciprocal axial inward and outward movement therein in a stroke of movement between an extended and a retracted position, the chamber having an axially inner chamber portion and an axially outer chamber portion, the inner portion opening outwardly into the outer chamber portion, in movement between the extended position and the retracted position, the outer disc is maintained within the outer chamber portion, in movement between the extended position and the retracted position, the inner disc is within the inner chamber portion in an inwardmost portion of the stroke and within the outer chamber portion in an outwardmost portion of the stroke, in the outer chamber portion the chamber wall being cylindrical, when the outer disc is in the outer chamber portion, the outer disc engaging the chamber wall to substantially prevent fluid flow in the outer chamber portion past the outer disc in an outward direction, when the inner disc is in the outer chamber portion the inner disc engaging the chamber wall to substantially prevent fluid flow in the outer chamber portion past the inner disc in an inward direction but the inner flexing disc elastically deforming away from the chamber wall of the outer chamber portion to permit fluid flow in the outer chamber portion past the inner disc in an outward direction, when the inner disc is in the inner chamber portion at least portions of the inner disc and the chamber wall are spaced radially to permit fluid flow in the inner chamber portion in both an inward direction and an outward direction past the inner disc.

BRIEF DESCRIPTION OF THE DRAWINGS

Further aspects and advantages of the present invention will become apparent from the following description taken together with the accompanying drawings in which.

DETAILED DESCRIPTION OF THE DRAWINGS

Figure 1:
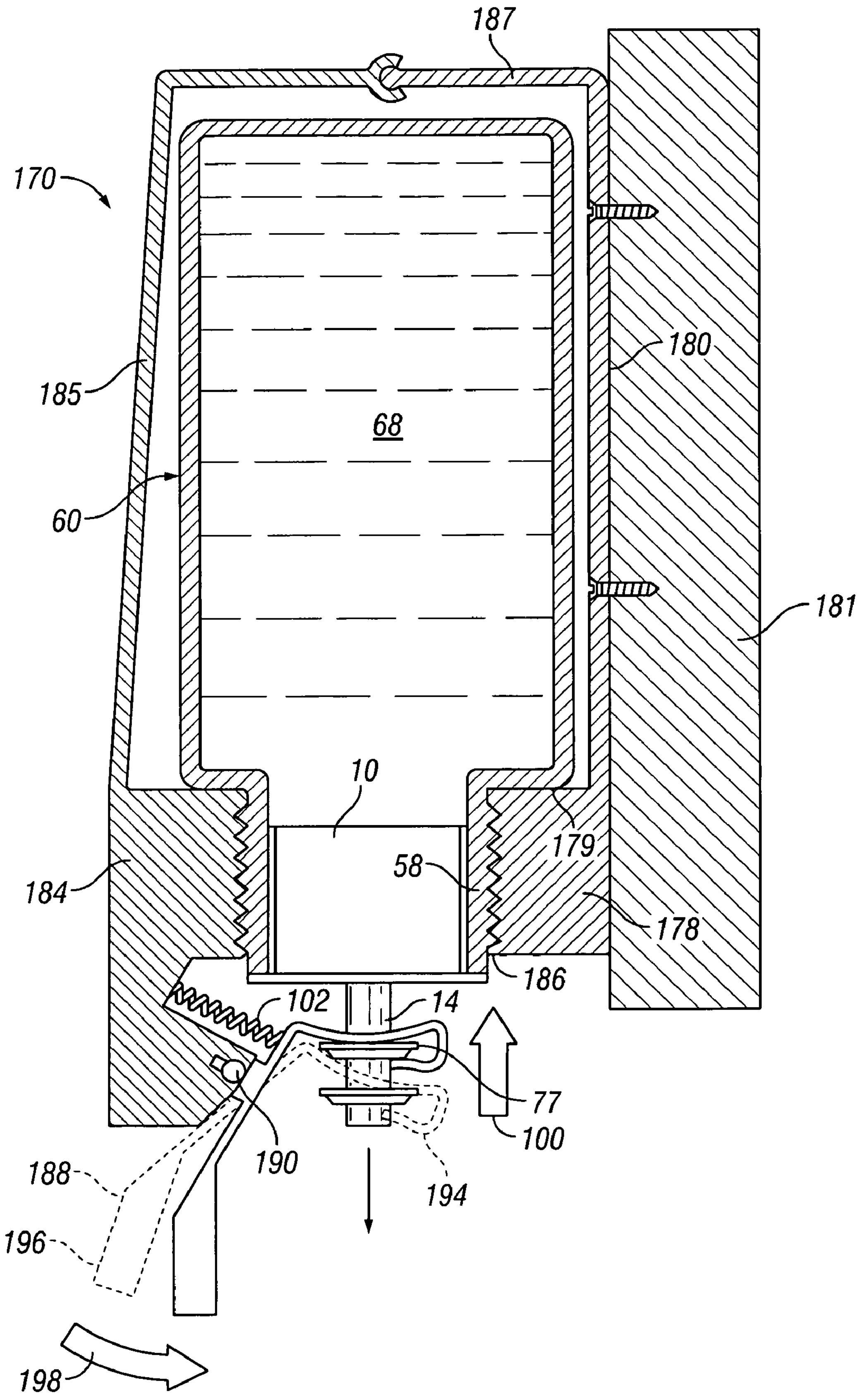
FIG. 1 is a partially cut-away side view of an embodiment of a liquid dispenser with a reservoir and a pump assembly in accordance with the present invention.

Reference is now made to FIG. 1 which shows a liquid soap dispenser generally indicated 170 utilizing a pump assembly 10 coupled to the neck 58 of a sealed, collapsible container or reservoir 60 containing liquid hand soap 68 to be dispensed. Dispenser 170 has a housing generally indicated 178 to receive and support the pump assembly 10 and the reservoir 60. Housing 178 is shown with a back plate 180 for mounting the housing, for example, to a building wall 181. A bottom support plate 184 extends forwardly from the back plate to support and receive the reservoir 60 and pump assembly 10. The pump assembly 10 is only schematically shown in FIG. 1, as including a slidable piston 14. As shown, bottom support plate 184 has a circular opening 186 therethrough. The reservoir 60 sits supported on shoulder 179 of the support plate 184 with the neck 58 of the reservoir 60 extending through opening 186 and secured in the opening as by a friction fit, clamping and the like. A cover member 185 is hinged to an upper forward extension 187 of the back plate 180 so as to permit replacement of reservoir 60 and its pump assembly 10.

Support plate 184 carries at a forward portion thereof an actuating lever 188 journalled for pivoting about a horizontal axis at 190. An upper end of the lever 188 carries a hook 194 to engage an engagement disc 77 carried on the piston 14 of the piston pump 10 and couple the lever 188 to piston 14 such that movement of the lower handle end 196 of lever 188 from the dashed line position to the solid line position, in the direction indicated by arrow 198 slides piston 14 inwardly in a retraction or discharge pumping stroke as indicated by arrow 100. On release of the lower handle end 196, a spring 102 biases the upper portion of lever 188 downwardly so that the lever draws piston 14 outwardly to a fully withdrawn position as seen in dashed lines in FIG. 1. Lever 188 and its inner hook 194 are adapted to permit manual coupling and uncoupling of the hook 194 as is necessary to remove and replace reservoir 60 and pump assembly 10. Other mechanisms for moving the piston 14 can be provided including mechanised and motorized mechanisms.

In use of the dispenser 170, once exhausted, the empty, collapsed reservoir 60 together with the attached pump assembly 10 are preferably removed and a new reservoir 60 and attached pump assembly 10 may be inserted into the housing.

Figure 2:
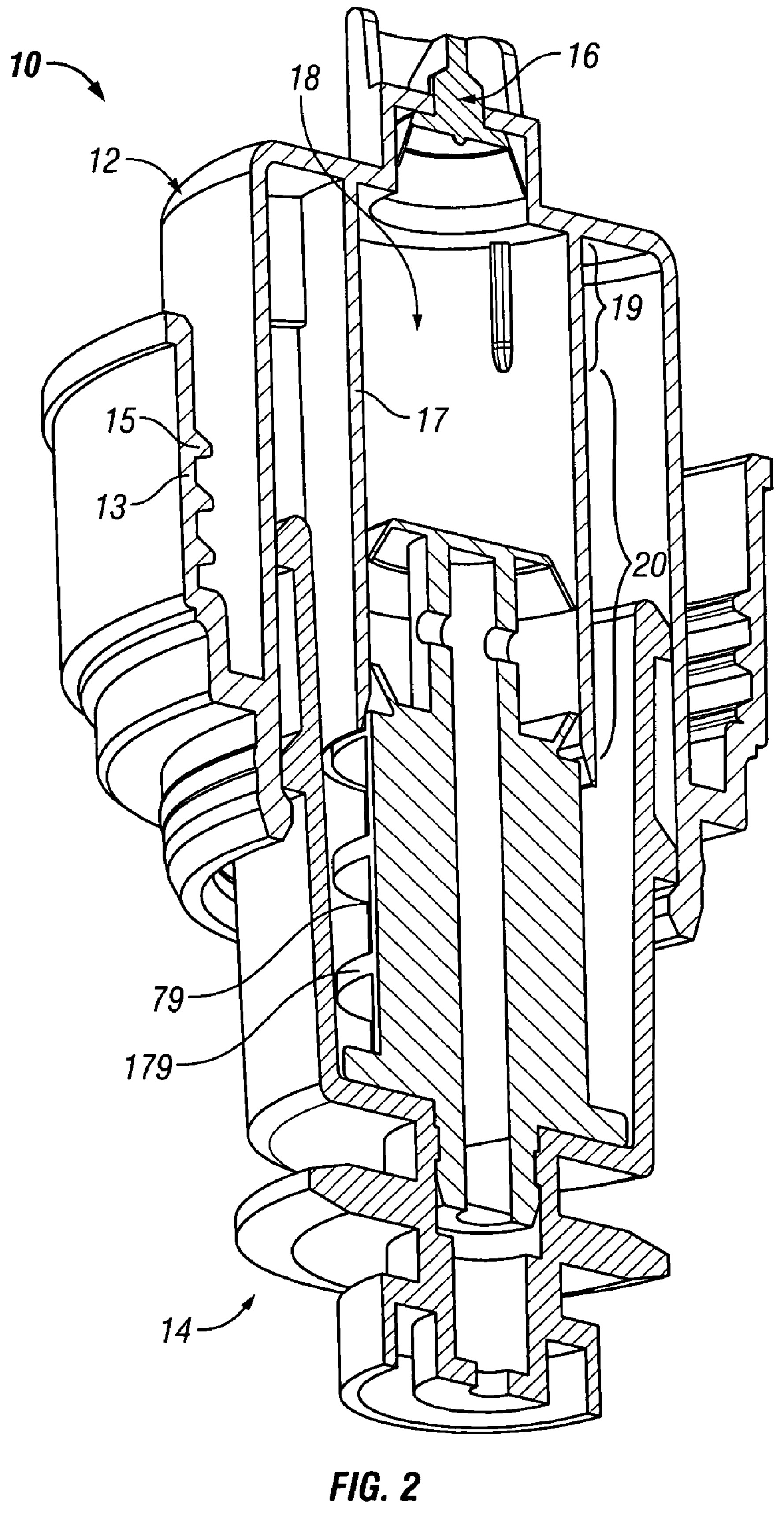
FIG. 2 is a schematic cross-sectioned pictorial view of a pump assembly in accordance with a first embodiment of the present invention is a fully extended position.
Figure 3:
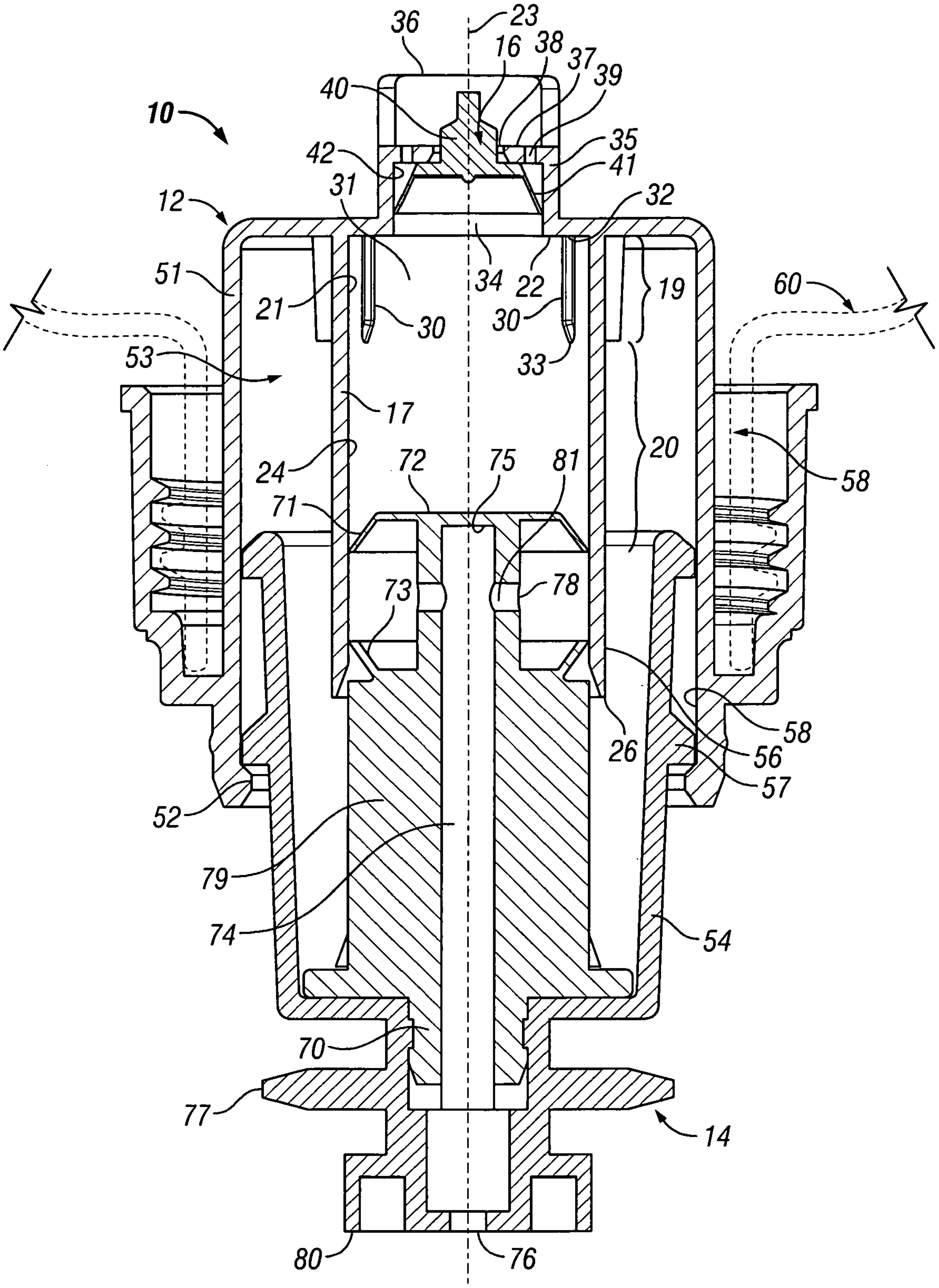
FIG. 3 is a schematic cross-sectional side view of the pump assembly of FIG. 2 is the fully extended position.
Figure 4:
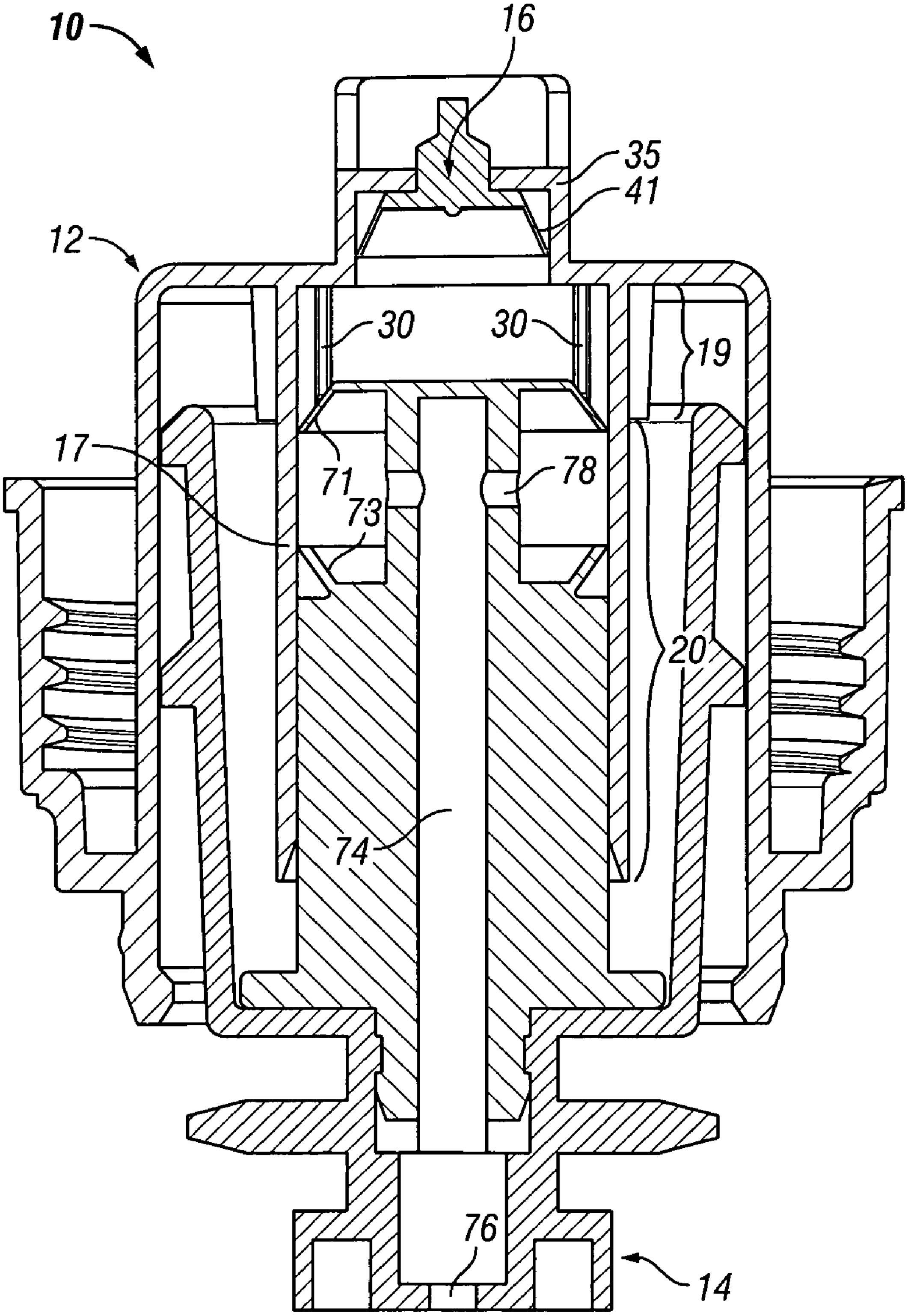
FIG. 4 is a view identical to that in FIG. 3 but with the pump assembly in an intermediate position between the fully extended position and the fully retracted position.

Reference is made first to FIGS. 2, 3 and 4 which schematically illustrate a pump assembly 10 in accordance with a first embodiment of the present invention generally adapted to be used as the pump assembly 10 shown in FIG. 1.

The pump assembly 10 comprises three principle elements, a piston chamber-forming body 12, a piston-forming element or a piston 14, and a one-way inlet valve 16. The body 12 carries an outer annular flange 13 with internal threads 15 which are adapted to engage threads of the neck 58 of a bottle 60 shown in dashed lines only in FIG. 3 which is to form the fluid reservoir.

The body 12 includes an interior center tube 17 which provides a cylindrical chamber 18 having an inner chamber portion 19 and an outer chamber portion 20. The inner chamber portion 19 has a chamber wall 21, an inner end 22 and an outer end. The inner chamber wall 21 is cylindrical but for including three axially and radially inwardly extending rib members 30 provided as part of the wall 21 and extending inwardly from cylindrical wall portions 31 of the inner chamber wall 21. Each rib member 30 extends axially from an inner end 32 proximate the inner end 22 of the inner chamber portion 19 to an outer end 33 defining the location of the outer end of the inner chamber portion 19.

The outer chamber portion 20 has a cylindrical chamber wall 24, an inner end and an outer end 26. The outer and inner chambers portions are axially adjacent each other with the outer end of the inner chamber portion 19 opening into the inner end of the outer chamber portion 20. The inner and outer chamber portions are coaxially in the sense of being disposed about the same central axis 23. The outer chamber portion 20 has its cylindrical side wall 24 substantially of a diameter the same as a diameter of the cylindrical wall portions 31 of the chamber wall 21 of the inner chamber portion 19.

An inlet 34 to the chamber 18 is provided in the inner end 22 of the inner chamber portion 19 as an outlet of an inlet tube 35 extending inwardly from the inner end 22 of the inner chamber portion 19 to an inner end 36 in communication with the bottle 60. A flange 37 extends across the inlet tube 35 having a central opening 38 and a plurality of inlet openings 39 therethrough. The one-way valve 16 is disposed across the inlet openings 39. The inlet openings 39 provide communication through the flange 37 with fluid in the bottle 60. The one-way valve 16 permits fluid flow from the bottle 60 into the inner chamber portion 19 but prevents fluid flow from the inner chamber portion 19 to the bottle 60.

The one-way valve 16 comprises a shouldered button 40 which is secured in snap-fit relation inside the central opening 38 in the flange 37 with a circular resilient flexing disc 41 extending radially from the button 40. The flexing disc 41 is sized to circumferentially abut a cylindrical wall 42 of the inlet tube 35 substantially preventing fluid flow there past from the inner chamber portion 19 to the bottle 60. The flexing disc 41 is deflectable away from the wall 42 to permit flow from the bottle 60 through the inlet tube 35 into the inner chamber portion 19.

The piston 14 is axially slidably received in the chamber 18 for reciprocal sliding motion inward and outwardly therein. The piston 14 is generally circular in cross-section. The piston 14 has a hollow stem 70 extending along the central longitudinal axis 23 through the piston.

A circular resilient flexing inner disc 71 is located at an inner end 72 of the piston and extends radially therefrom. When the inner disc 71 is in the outer chamber portion 20, the inner disc 71 extends radially outwardly on the stem 70 to circumferentially engage the chamber wall 24 of the outer chamber portion 20. The inner disc 71 is sized to circumferentially abut the chamber wall 24 of the outer chamber portion 20 when the inner disc 71 is in the outer chamber portion 20 to substantially prevent fluid flow therebetween inwardly. The inner disc 71 is biased radially outwardly, however, is adapted to be deflected radially inwardly so as to permit fluid flow past the inner disc 71 outwardly.

Figure 5:
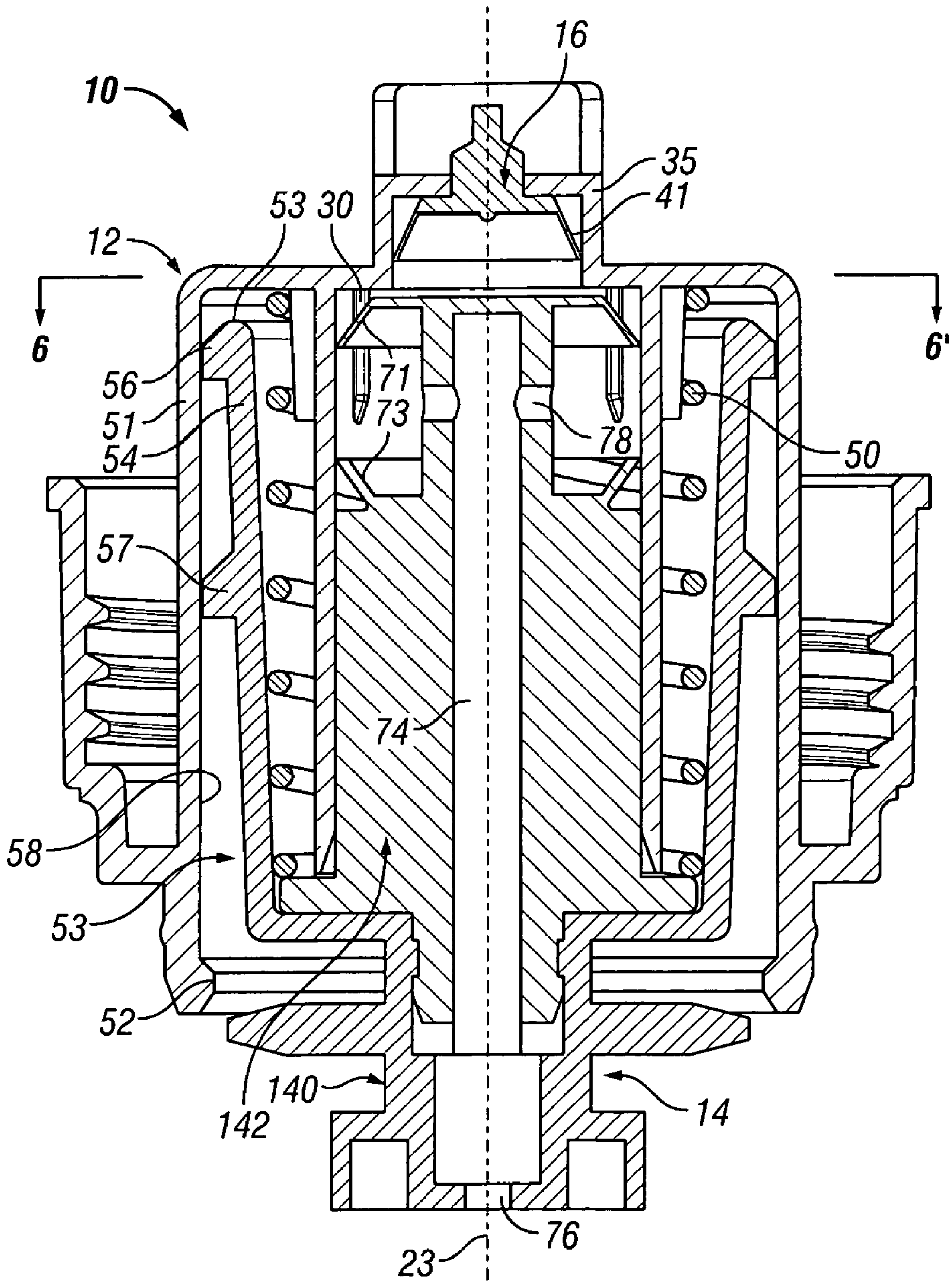
FIG. 5 is a view identical to that in FIG. 3 but with the pump assembly in a fully retracted position.
Figure 6:
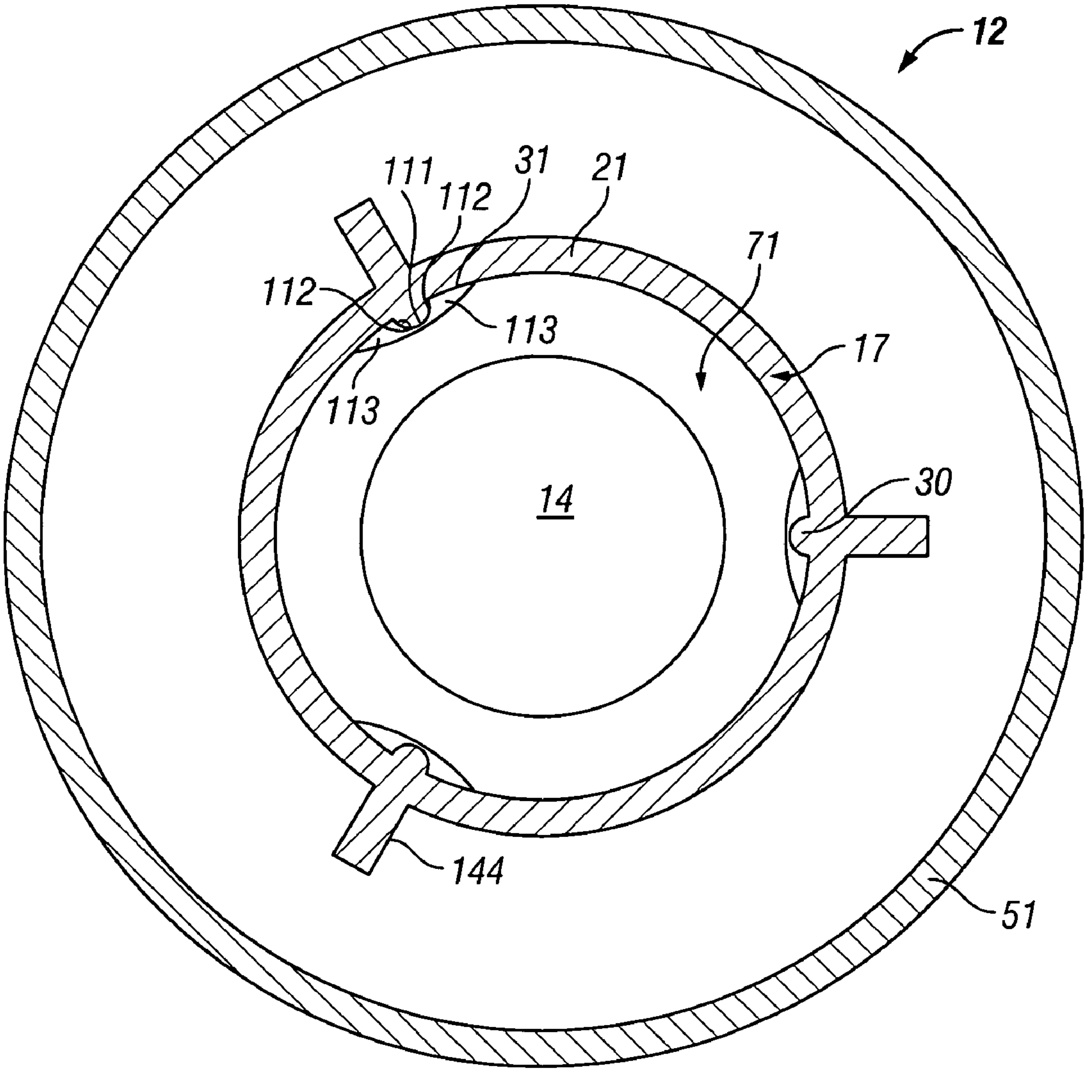
FIG. 6 is a cross-sectional view along section line 6-6' in FIG. 5.

When the inner disc 71 is in the inner chamber portion 20, engagement between the inner disc 71 and the three rib members 30 deflect edge portions of the inner disc 71 radially inwardly so as to permit fluid flow past the inner disc 71 inwardly and outwardly as best seen in FIG. 6. FIG. 6 illustrates a cross-sectional view along section 6-6' in FIG. 5 showing the inner disc 71 as deflected inwardly by the rib members 30 such that the inner disc 71 engages the radial inner end 111 of the rib member 30 and adjacent each circumferential side 112 of each rib member 30, the sealing disc 71 does not engage the wall 21 and axially extending passageways 113 are formed between the side 112 of the rib member 30, the inner disc 71 and the circumferential portion 31 of the wall 21 of the inner chamber portion 19.

An outer circular outer disc 73 is located on the stem 70 spaced axially outwardly from the flexing disc 71. When the outer disc 73 is in the outer chamber portion 20, the outer disc 73 extends radially outwardly on the stem 70 to circumferentially engage the chamber wall 24 of the outer chamber portion 20. The outer disc 73 is sized to circumferentially abut the chamber wall 24 of the outer chamber portion 20 when the outer disc 73 is in the outer chamber portion 20 to substantially prevent fluid flow therebetween outwardly. The outer disc 73 is biased radially outwardly, however, may optionally be adapted to be deflected radially inwardly so as to permit fluid flow past the outer disc 73 inwardly. Preferably, the outer disc 73 engages the chamber wall 24 of the outer chamber 20 to prevent flow there past both inwardly and outwardly.

The piston stem 70 has a hollow central outlet passageway 74 extending along the axis of the piston from a closed inner end 75 located in the stem between the inner disc 71 and the outer disc 73 to an outlet 76 at an outer end 80 of the piston. A channel 81 extends radially from an inlet 78 located on the side of the stem between the inner disc 71 and the outer disc 73 inwardly through the stem into communication with the central passageway 74. The channel 81 and central passageway 74 permit fluid communication through the piston 14 past the outer disc 73 between the inlet 78 and the outlet 76.

An outer circular engagement flange 77 is provided outwardly from the outer disc 73 on an outermost end portion of the stem which extends radially outwardly from the outer end 26 of the outer chamber portion 20. The flange 77 may be engaged by an actuating device, such as the lever 188 in FIG. 1, in order to move the piston 14 in and out of the body 12. Axially extending webs or ribs 79 and radially extending circular flanges 179 may be provided to extend radially from the stem 70 to assist in maintaining the piston 14 in axially centred and aligned arrangement when sliding into and out of the chamber 18.

The piston 14 is slidably received in the chamber 18 of the body 12 for reciprocal axial inward and outward movement therein in a stroke of movement between a fully extended position shown in FIG. 3 and the fully retracted position shown in FIG. 5. In movement between the extended position of FIG. 3 and the retracted position of FIG. 5, the outer disc 73 is at all times maintained within the outer chamber portion 20.

In movement of the piston 14 between the extended position and the retracted position, the piston assumes the intermediate position shown in FIG. 4 in which the inner disc 71 is disposed in the outer chamber portion 20 at the inner end of the outer chamber portion 20 and on further movement inward will enter the inner chamber portion 19 and come to be deflected inwardly by the rib members 30. An innermost portion of each stroke is to be considered the movement of the piston 14 between the intermediate position of FIG. 4 and the retracted position of FIG. 5. Similarly, an outwardmost portion of each stroke is to be considered movement between the intermediate position of FIG. 4 and the extended position of FIG. 3. A cycle of operation is now described in which the piston 14 is moved from the extended position of FIG. 3 to the retracted position of FIG. 5 in a fluid discharging stroke and then from the retracted position of FIG. 5 to the extended position of FIG. 3 in a fluid charging stroke. The charging stroke and the discharge stroke together comprise a complete cycle of operation.

In moving from the extended position of FIG. 3 to the intermediate position of FIG. 4, that is, in the outermost portion of the discharge stroke, as the piston 14 moves inwardly, fluid within the chamber 18 is compressed between the inner disc 71 and the one-way inlet valve 16. The one-way inlet valve 16 effectively closes under pressure and as pressure is developed within the chamber 18, the inner disc 71 deflects to permit fluid to pass outwardly past the inner disc 71 to between the inner disc 71 and the outer disc 73 and hence via the inlet 78 to the outlet passageway 74 and out the outlet 76. In inward movement from the intermediate position of FIG. 4 to the retracted position of FIG. 5, in an inwardmost portion of the discharge stroke, the inner disc 71 will be mechanically deflected by engagement with the rib members 30 to permit fluid to pass outwardly past the inner disc 71. Thus, in the discharge stroke, throughout the entirety of the discharge stroke, that is, in both the outwardmost portion of the discharge stroke and the inwardmost portion of the discharge stroke, the inner disc 71 is deflected to permit fluid to pass outwardly past the inner disc 71 and hence out the outlet 76.

In an innermost portion of the charging stroke, the piston 14 is moved from the retracted position of FIG. 5 outwardly to proximate the intermediate position of FIG. 4. In the innermost portion of the charging stroke, the inner disc 71 is within the inner chamber portion 19 and the inner disc 71 is by engagement between the inner disc 71 and the rib members 30, deflected radially inwardly so as to permit fluid flow past the inner disc 71 inwardly. The outer disc 73, however, is at all times in the charging stroke, within the outer chamber portion 20 engaging the chamber wall 24 of the outer portion 20 so as to prevent fluid flow inwardly therepast. As a result, a vacuum is created within the chamber 18 inwardly of the outer disc 73 between the outer disc 73 and the one-way inlet valve 16 which vacuum will draw fluid inwardly from the outlet 76 via the passageway 74 and the channel 81 into the chamber 18. This vacuum will draw towards the chamber 18 any fluid in the passageway 74 and channel 81 including air, liquid or foam therein and air from the atmosphere inwardly through the outlet 76. This vacuum within the chamber 18 will also be applied to the one-way valve 16 and will attempt to deflect the flexing disc 41 of the one-way valve 16 to draw fluid into the chamber 18 from the reservoir 60. Preferably, having regard to the nature of the fluids present in the pump, the resistance of fluid and air to flow through the outlet 76, the passageway 74 and the channel 81 and the size and resiliency of the flexing disc 41 of the one-way valve 16, the vacuum created in the chamber 18 will draw fluid back from the outlet 76 to a desired extent. In one preferred configuration, the flexing disc 41 is biased into the wall 42 of the inlet tube 35 such that in the innermost portion of the charging stroke the vacuum within the chamber 18 is not sufficiently large to open the one-way valve 16 to permit fluid flow therepast outwardly into the chamber 18.

In the charging stroke, once the piston 14 reaches the intermediate position of FIG. 4, the inner disc 71 comes to sealably engage the chamber wall 24 of the outer chamber portion 20 and, subsequently, in the outermost portion of the charging stroke, that is, in movement from the intermediate position of FIG. 4 to the extended position of FIG. 3, a vacuum is created in the chamber 18 inwardly of the inner disc 71 which vacuum operates on the one-way valve 16 so as to open the one-way valve 16 and draw fluid from the bottle 60 into the chamber 18.

The relative axial length of the inner chamber portion 19 and the outer chamber portion 20 can be selected so as to select the relative volume of fluid that is drawn back into the chamber 18 via the outlet 76 in the inwardmost portion of the charging stroke as contrasted with the volume of fluid from the bottle 60 that is drawn into the chamber 18 in the outwardmost portion of the charging stroke. In the preferred first embodiment, variation of the relative axial lengths of the inner chamber portion 19 and the outer chamber portion 20 can be provided simply by varying the length of the rib members 30, that is, preferably by varying the distance that the outer end 33 of each rib member 30 is located from the inner end 22 of the inner chamber portion 19.

In the preferred embodiment illustrated in FIGS. 2 to 5, it is preferred that when at rest, as in storage before use or when waiting between cycles of operation, the inner disc 71 be disposed within the outer chamber portion 20 and thus not disposed within the inner chamber portion 19. Having the inner disc 71 within the inner chamber portion 19 during a period of rest for an extended period of time may cause the inner disc 71 to be permanently deformed by engagement with the rib members 30 into a configuration which does not provide for a good seal between the inner disc 71 and the chamber wall 24 of the outer chamber portion 20 when the inner disc 71 may be moved into the outer chamber portion 20. Thus, as illustrated in FIG. 1, the activating lever 188 is preferably biased so as to urge the piston 14 to assume the extended position under the bias of the spring 102 as shown in dashed lines in FIG. 1. As shown only in FIG. 5, biasing of the piston 14 toward the fully extended position can be accommodated by a coil spring 50 disposed between the body 12 and the piston 14 coaxially about the axis 23 and biasing the piston 14 outwardly from the body 12. As seen in FIG. 5, the body 12 includes an outer tube 51 having a stop flange 52 at its outer end. An annular cavity 53 is defined between the outer tube 51 and inner tube 17. The piston 14 includes a guide tube 54 open at an inner end 53 and carrying annular flanges 56 and 57 to engage the inner surface 58 of the outer tube 51 of the body 12 to assist in coaxially locating the piston 14 within the body 12. The outermost flange 57 serves as a stop flange to engage the stop flange 52 on the outer tube 51 of the body 12 to prevent the piston 14 from being moved outwardly from the body 12 beyond the fully extended position. As seen in FIG. 5, the coil spring 50 is disposed in the annular cavity 53 in between the guide tube 54 of the piston 14 and the inner tube 17 of the body 12. The body 12 preferably is a unitary element formed entirely of plastic preferably by injection molding. The piston 14 is illustrated as being made from two elements, namely a center element 140 and a skirt element 142 each preferably by injection molded foam plastic and then secured together.

In the preferred embodiment of FIGS. 2 to 6, as best seen in FIG. 6, the inner tube 17 has three axially extending reinforcing flanges 144 which extend radially outwardly from the inner tube 17 in line with the rib members 30, however, these flanges 144 are not necessary.

In the preferred embodiment of FIGS. 2 to 6, when the inner disc is in the inner chamber 19, at least portions of the inner disc 71 and the chamber wall 21 are spaced radially to permit fluid flow in the chamber 18 in both an inward direction and an outward direction past the inner disc, however, for proper operation of a pump in accordance with the present invention, it is merely necessary that when the inner disc is in the inner chamber, that portions of the inner disc 71 and the chamber wall 21 are spaced radially to permit fluid flow in the chamber inwardly therepast.

In the preferred embodiment illustrated in FIGS. 2 to 6, while the inner disc 71 is within the inner chamber portion 19, fluid flow passes between the inner disc 71 and the chamber wall 21 by reason of at least portions of the inner disc 71 and the chamber wall 21 being spaced radially. This radial spacing between the inner disc 71 and the chamber wall 21 can be provided in a number of other arrangements. For example, rather than providing axially and radially inwardly extending rib members 30 as part of the wall 21 of the inner chamber portion 19, axially extending flutes or channels may be provided in the chamber wall 21 which at least over some circumferentially extending portion of the wall 21 provides an increased diameter to the wall 21 upon which the inner disc 71 cannot provide a seal.

Figure 7:
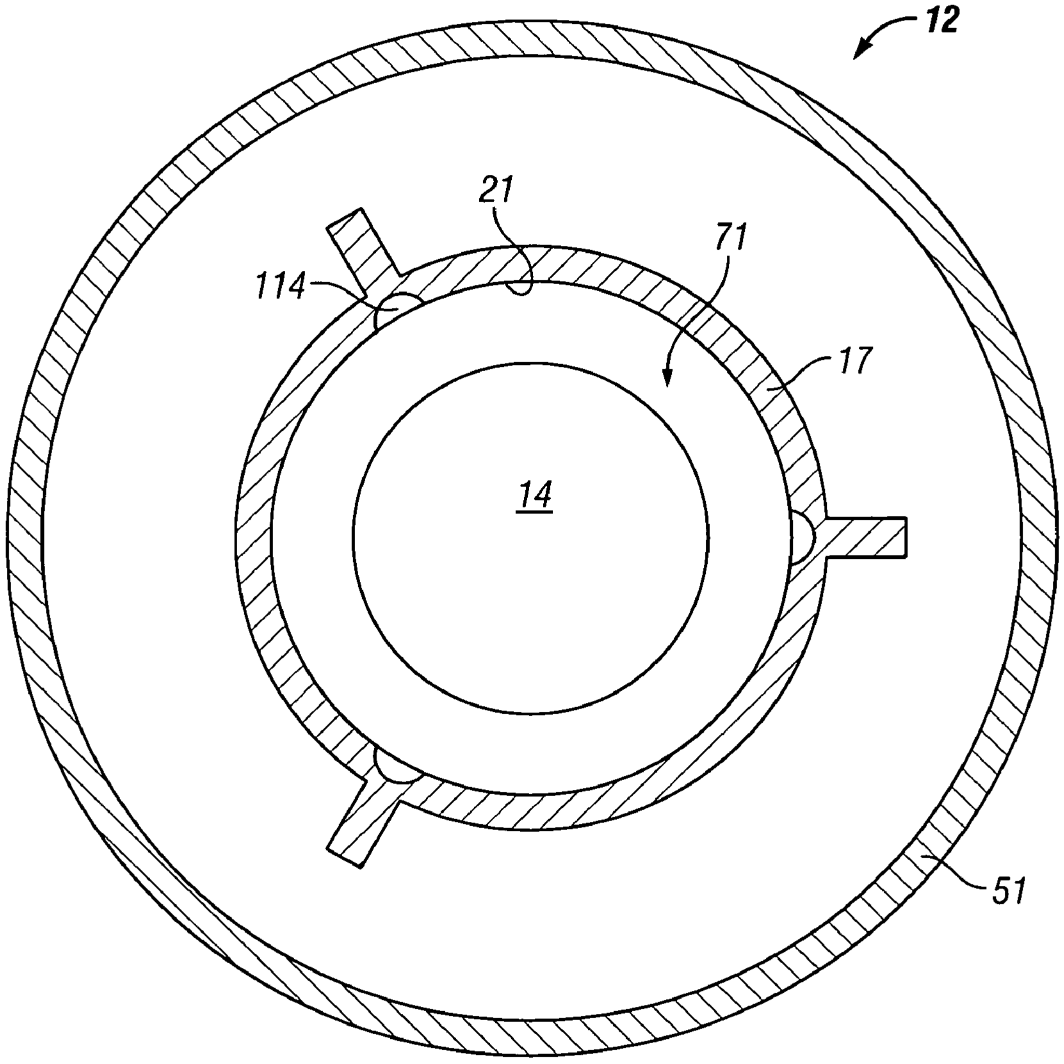
FIG. 7 is a cross-sectional view the same as FIG. 6 but of a pump assembly in accordance with a second embodiment of the present invention.

Reference is made to FIG. 7 which shows a view the same as that shown in FIG. 6, however, of another embodiment in which in the place of each rib member 30, an axially extending flute or channelway 114 is provided which is cut radially outwardly into the wall 21 of the inner chamber portion 19 and provides an axially extending passage for fluid flow past the inner disc 71 while the inner disc 71 is within the inner chamber portion 19.

Figure 8:
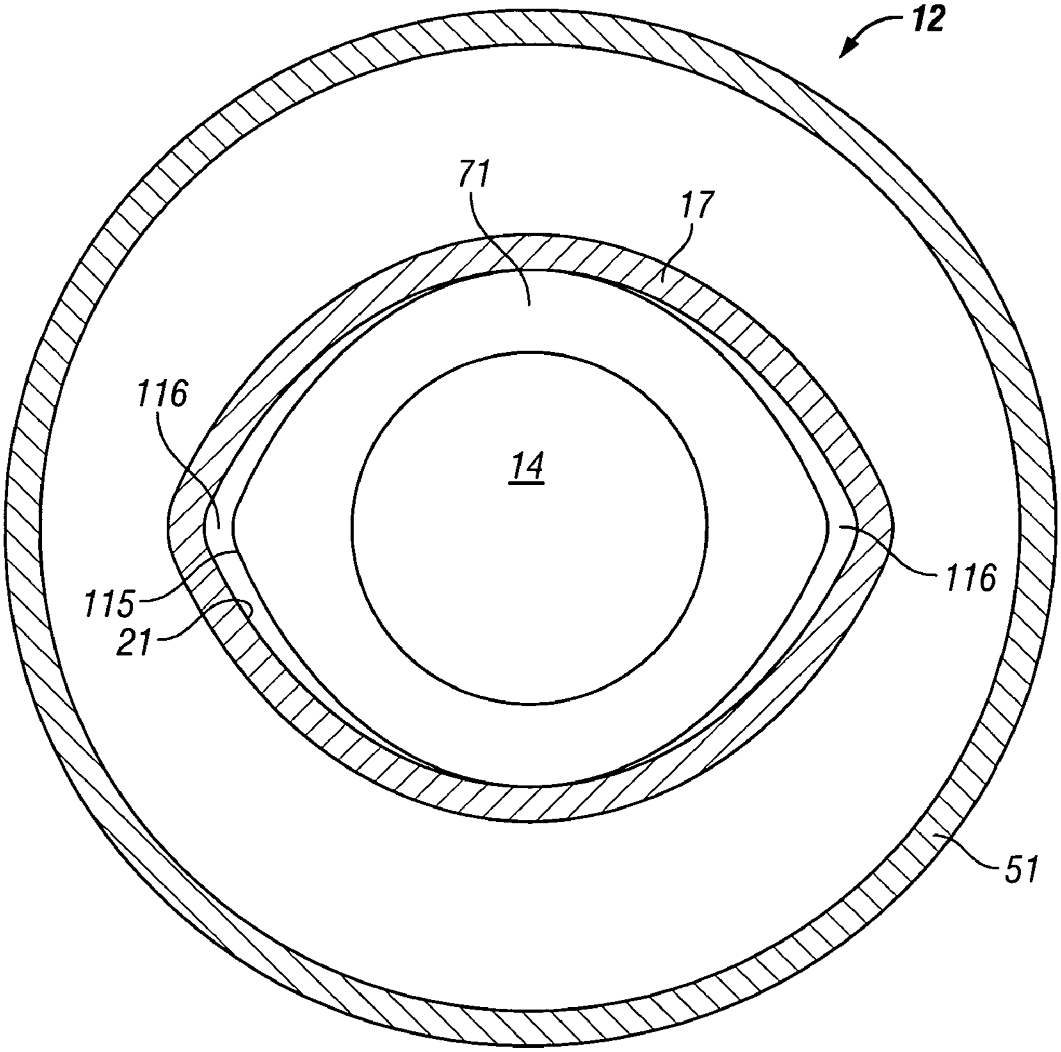
FIG. 8 is a cross-sectional view the same as FIG. 6 but of a pump assembly in accordance with a third embodiment of the present invention.

FIG. 8 illustrates another cross-sectional view similar to FIG. 6, however, of another embodiment in which the rib members are not provided but rather the inner chamber portion 19 is not cylindrical about the axis 23 but rather is oval and provides at the opposite ends of the major axis of the oval passageways 116 where outer edge 115 of the inner disc 71 is spaced radially from the chamber wall 21 providing for axial passage of fluid therebetween. In FIG. 8, the inner chamber portion 19 may be cylindrical at its outer end corresponding to the inner end of the outer chamber portion 20 and the inner chamber portion 19 may transition gradually as it extends inwardly from a circular cross-section into the oval cross-section seen in FIG. 8. Of course, the inner chamber portion 19 could transition inwardly gradually or abruptly into other shapes than oval which provide for one or more such passageways 116 preferably with the shape and transition of the side wall 21 being such that the inner disc 73 will smoothly slide through the transition.

Figure 9:
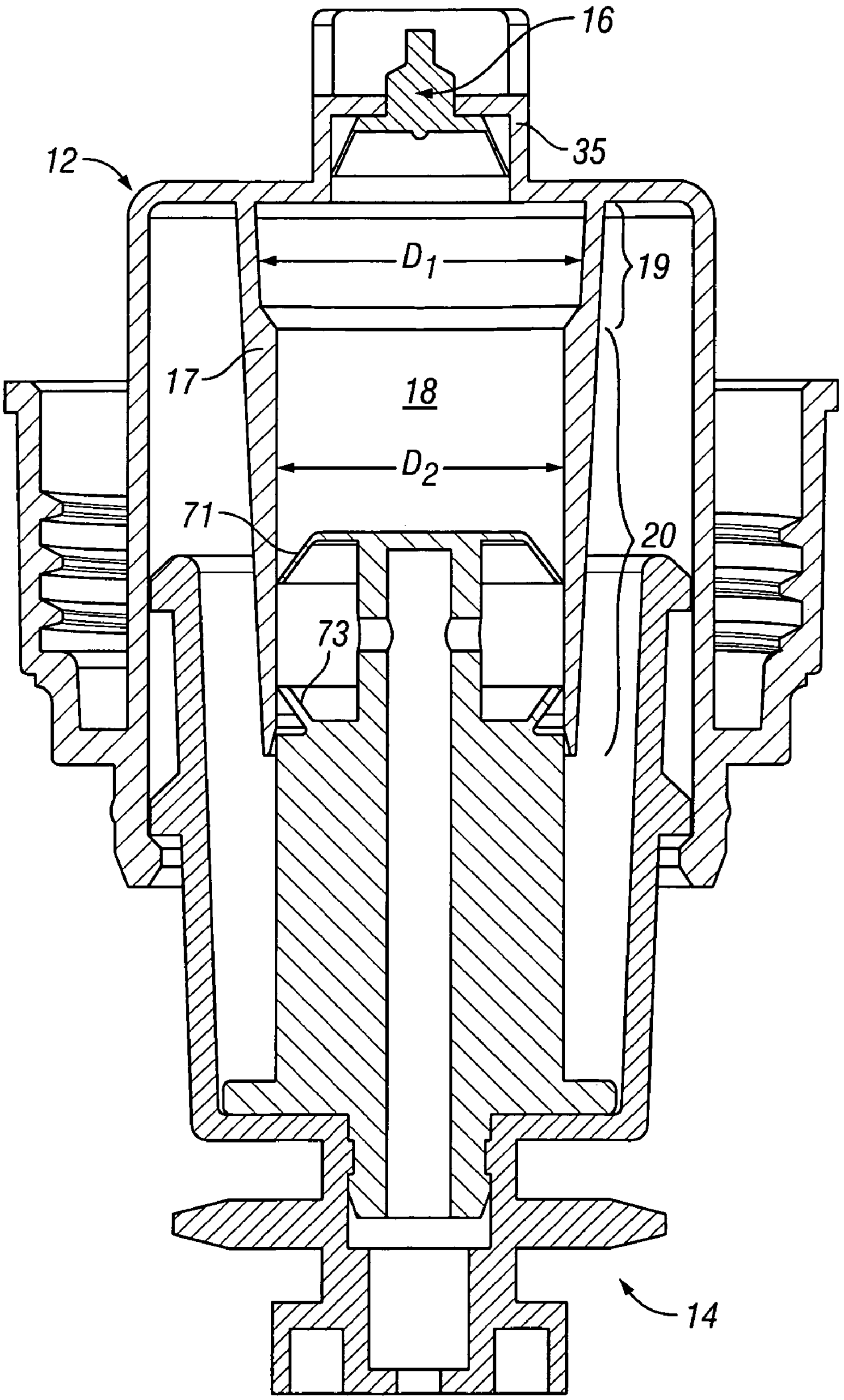
FIG. 9 is a view identical to FIG. 5 but of a pump assembly in accordance with a fourth embodiment of the present invention.

FIG. 9 illustrates a further embodiment of the present invention which is identical to that shown in FIG. 3, however, in which the rib members 30 are removed and the chamber 18 is stepped in a sense that the inner chamber portion 19 is of a reduced diameter, D1, compared to a diameter, D2, of the outer chamber portion 20. The inner chamber portion 19 has a sufficiently enlarged diameter that the inner disc 71 will be spaced radially from the chamber wall 21 when the inner disc 71 is in the inner piston portion 19 such that the inner disc 71 does not form a seal with the wall 21 of the inner chamber portion 19 on movement of the piston 14 outwardly in the innermost portion of the charging stroke. Generally, in the context of manufacturing the body 12 by injection molding from a unitary piece of plastic, forming the inner chamber portion 19 to be of an enlarged diameter compared to the outer portion 20 is difficult in the context of injection molding particularly as contrasted with providing the radially inwardly extending rib members 30 as in the preferred embodiment of FIGS. 2 to 6 which can be readily molded by injection molding.

Figure 10:
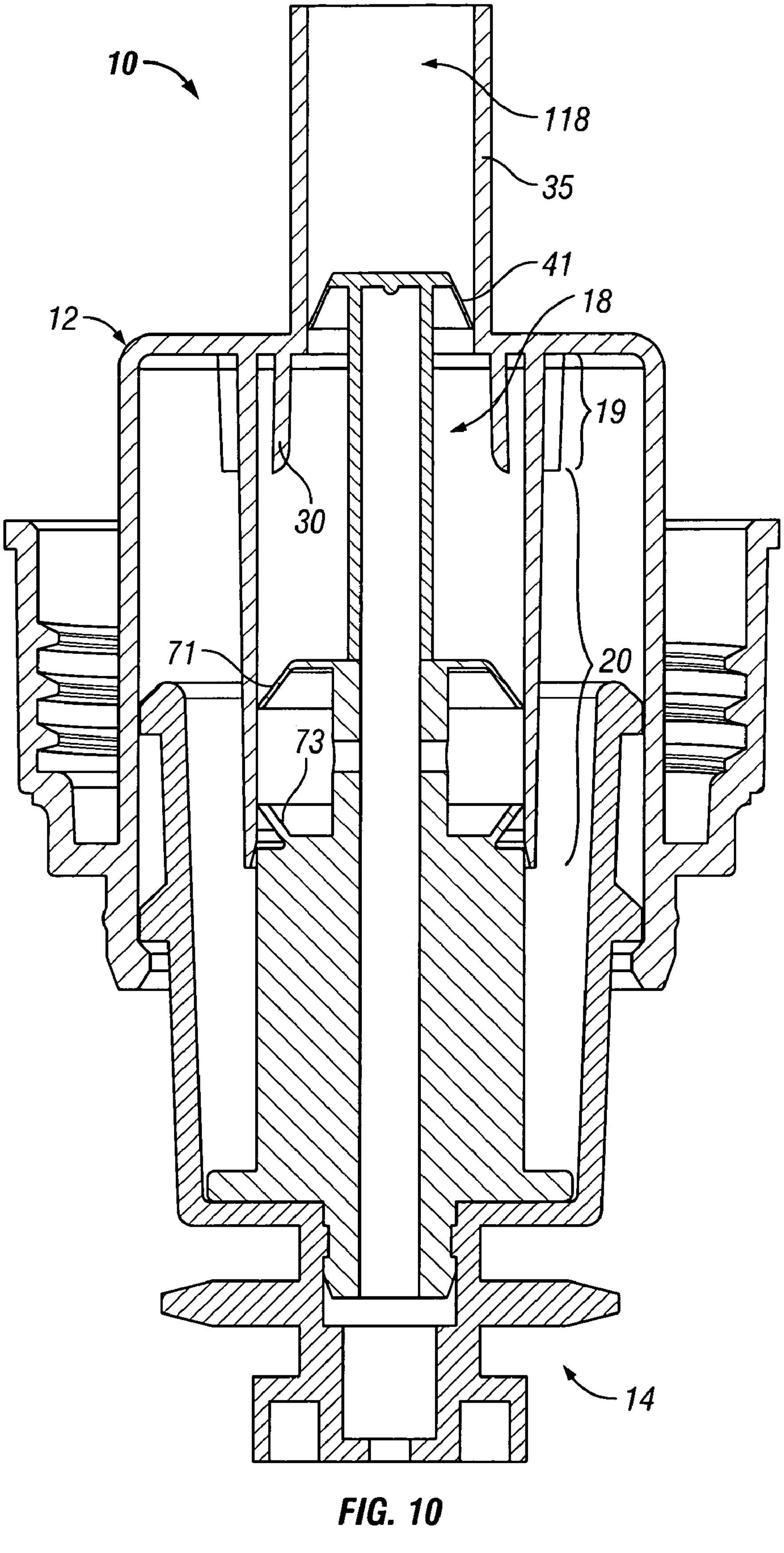
FIG. 10 is a schematic cross-sectional side view of a pump in accordance with a fifth embodiment of the present invention in a fully extended position.

Reference is made to FIG. 10 which shows a second embodiment of a pump assembly 10 in accordance with the present invention with the piston 14 in an extended position. The embodiment of FIG. 10 is identical to the pump shown in FIGS. 2 to 6, however, the one-way valve 16 in FIGS. 2 to 6 has been replaced by providing the flexing disc 41 on the piston 14 and providing the inlet tube 35 to provide a chamber 118 to receive the flexing disc 41. With the chamber 118 in the inlet tube 35 having a diameter which is less than the diameter of the chamber 18, a stepped arrangement is provided which in effect provides a one-way valve mechanism. As is to be appreciated, while the inner disc 71 is in the outer chamber portion 20, outward movement of the piston 14 will draw fluid outwardly past the flexing disc 41 and inward movement of the piston 14 will create pressure between the flexing disc 41 and the inner disc 71 in part due to a reduction in the volume between the disc 41 and the inner disc 71 between the chamber 18 and the chamber 118.

Figure 11:
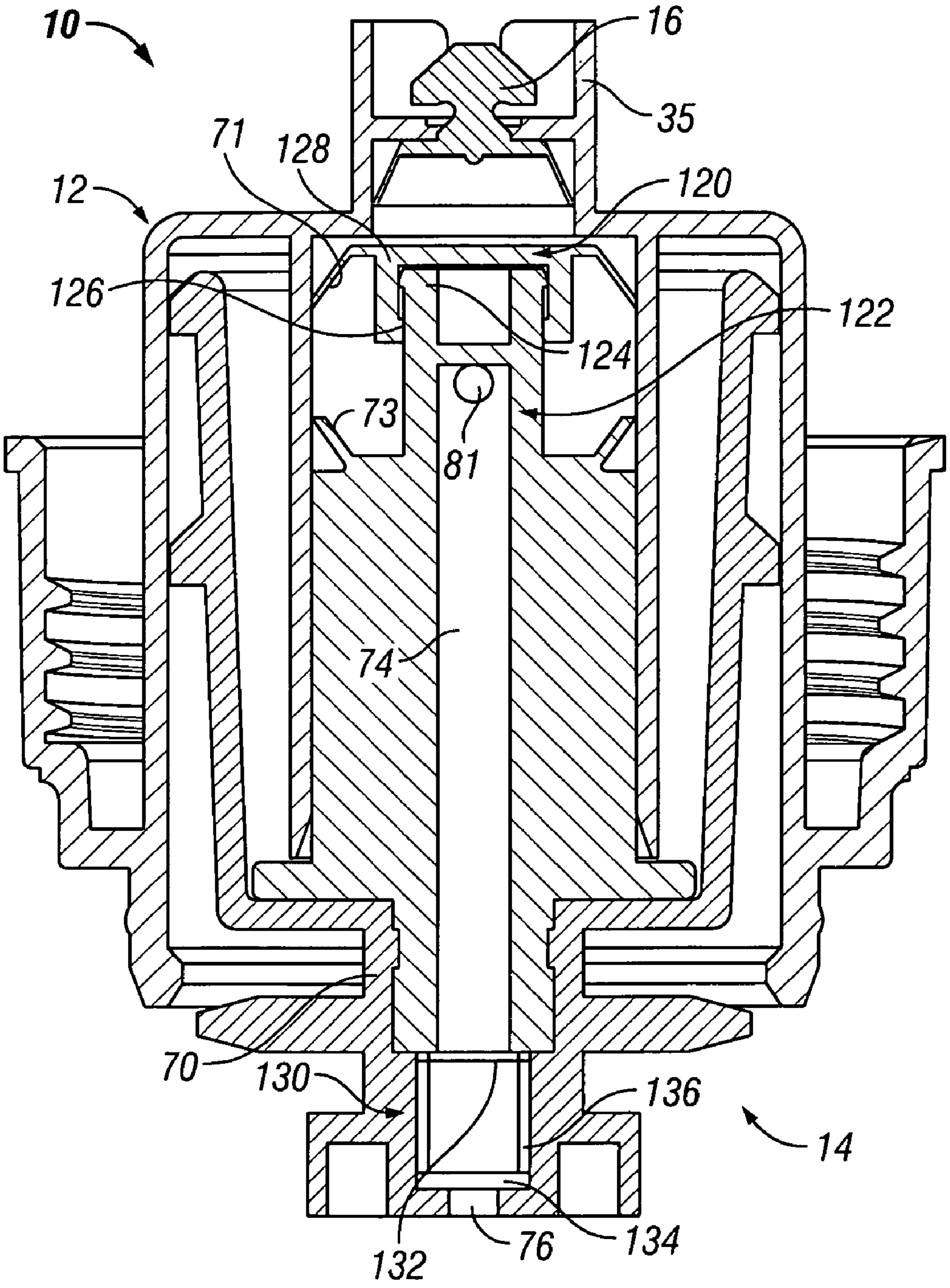
FIG. 11 is a schematic cross-sectional side view of a pump in accordance with a sixth embodiment of the present invention with the pump assembly in a fully retracted position.
Figure 12:
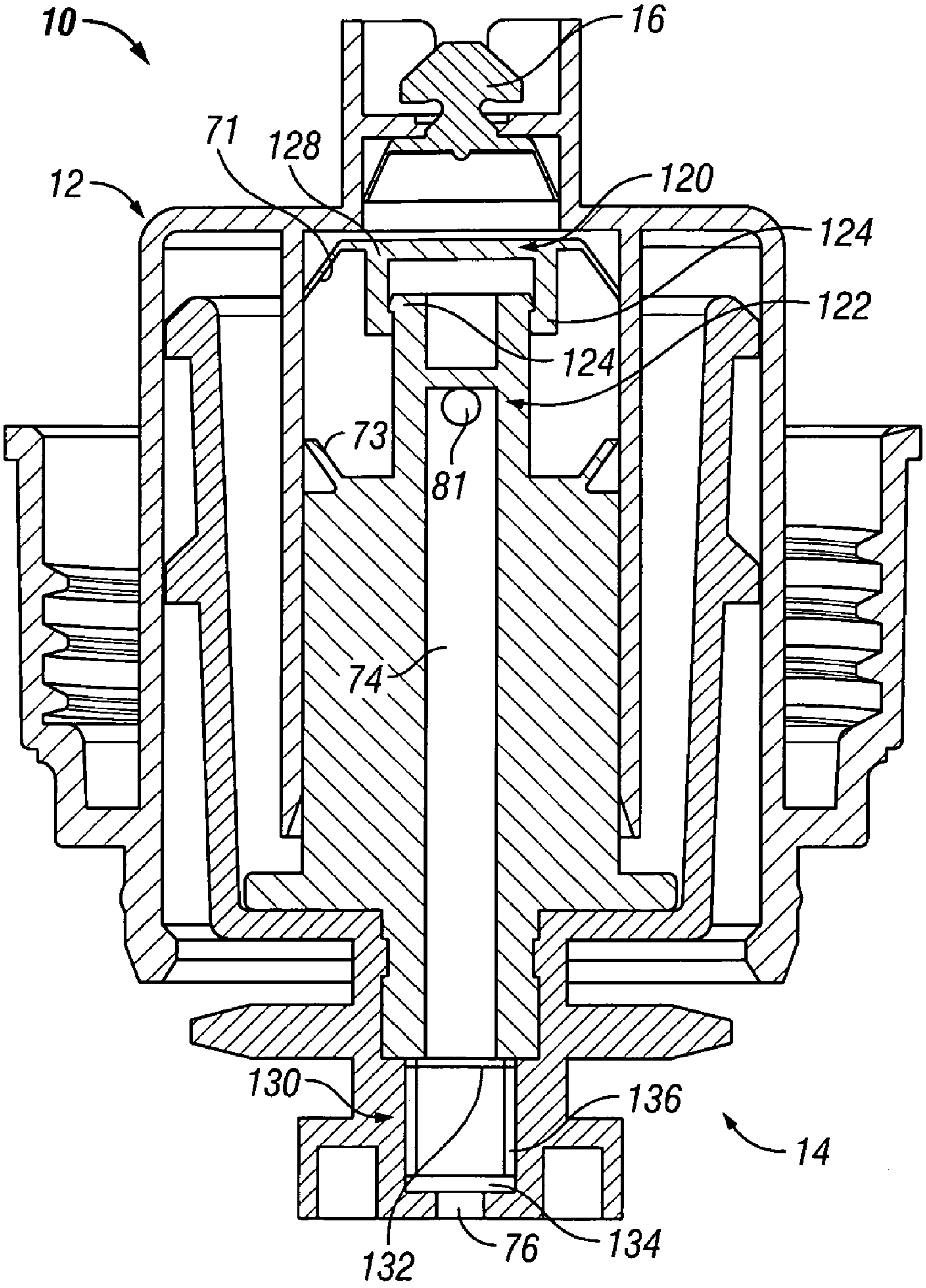
FIG. 12 is a view identical to FIG. 11 but in which portions of the piston has been moved toward a withdrawn position from the fully retracted position.

Reference is made to FIGS. 11 and 12 which shows a pump assembly 10 in accordance with a further embodiment of the present invention which is identical to the embodiment illustrated in FIGS. 2 to 6 with two exceptions. Firstly, the rib members 30 have been removed from the chamber 18. Secondly, the inner disc 71 is carried on a separate innermost slide portion 120 of the piston 14 which is axially slidable relative to a remainder portion 122 of the piston 14 between a retracted condition shown in FIG. 11 and an extended condition shown in FIG. 12. As a result, in a charging stroke, on movement of the piston 14 inwardly, the inner piston portion 120 will come to assume the retracted condition and in the charging stroke, on movement of the piston 14 outwardly, the inner piston portion 120 will come to assume the extended condition. At the end of a discharge stroke, with the piston 14 in the fully extended position as seen in FIG. 11, the inner piston portion 120 is in the retracted condition. At the initiation of a charging stroke, on movement of the remainder portion 122 of the piston 14 outwardly, the remaining portion 122 will move outwardly initially without movement of the inner piston portion 120. As a result, during this initial phase of movement of the remaining piston portion 120 only, the volume between the inner disc 71 and the outer disc 73 will increase drawing fluid inwardly via the outlet 76 into the chamber 18.

The innermost end of the stem 70 of the remainder portion 122 carries an annular stop flange 124 which is adapted to be engaged with an annular stop flange 126 provided on a tubular portion 128 of the stem of the inner piston portion 120. In the charging stroke, the remainder portion 122 of the piston 14 will slide outwardly relative to the inner piston portion 120 until the stop flange 124 on the remainder portion 122 engages the stop flange 126 on the inner piston portion 120, after which the remainder portion 122 of the piston 14 will draw the inner piston portion 120 outwardly therewith and thus create a vacuum between the inner disc 71 and the one-way inlet valve 16 so as to draw fluid past the one-way valve 16 into the chamber 18. Adjusting the relative axial extent to which the inner piston portion 120 can slide between the extended condition and the retracted condition can be used to adjust the extent that draw back of fluid from the outlet 76 is obtained.

FIGS. 11 and 12 also show an alternate embodiment for a forward portion of the piston 14 shown in FIG. 2. In the embodiment of FIGS. 2 to 5, the passageway 74 through the piston 14 is substantially unrestricted other than with a narrowing at the ultimate outlet 76 which can serve a purpose of forming a nozzle, however, such narrowing is not necessary. The forward portion of the piston 14 shown in FIGS. 11 and 12 is identical to that shown in FIGS. 2 to 6, however, includes a foam generator 130 comprising a pair of spaced discs 132 and 134 held apart by a hollow cylindrical tube 136. Each of the discs 132 and 134 has small apertures therethrough and may be formed as, for example, by a small meshed screen. On the passage of liquid and air simultaneously outwardly through the discs 132 and 134, turbulence is created in the liquid and air which produces a discharge of foam being foamed liquid and air from the outlet 76. In accordance with the present invention, in the charging stroke, the draw back of fluid into the chamber in the innermost portion of the charging stroke can be selected so as to draw air from the atmosphere via the inlet 76 into the chamber 18, for example, preferably to at least partially into the space between the inner disc 71 and the outer disc 73. Subsequently, on a discharge stroke, liquid and air are simultaneously forced outwardly through the foam generator 130 to generate foam. Thus, in accordance with this further embodiment of the invention, a simple arrangement is provided for producing a foam discharge rather than merely a discharge of the liquid.

In accordance with the present invention, the volume of the draw back through the inlet 78 in the innermost portion of the charging stroke may be selected so as to accomplish one or more draw back objectives. For example, the draw back may be selected so as to merely draw back a small volume as, for example, to draw back liquid droplets which may hang outwardly from the outlet 76 such that all fluid is drawn back inside the nozzle outlet 76 and may be held inside the outlet 76 as by surface tension. As another example, the draw back may be sufficient that all liquid in the passageway 74 is drawn back substantially to the channel 81 or its inlet 78 towards reducing dripping of liquid from the channelway 74 and the inlet 78 as restricted, for example, by surface tension about the inlet 78. As another example, draw back may be substantial so as to draw air from the inlet 76 back into the chamber 18. Various selections may be made by persons skilled in the art according to the objective to be achieved by the draw back and having regard to the nature of the fluid as dispensed including particularly the viscosity and the relative size of the restrictions, for example, in the outlet 76 and the inlet 78.

A pump in accordance with the present invention may be used either with bottles which are vented or bottles which are not vented. Various venting arrangements can be provided so as to relieve any vacuum which may be created within the bottle 60. Alternatively, the bottle 60 may be configured, for example, as being a bag or the like which is readily adapted for collapsing.

A pump in accordance with the present invention is preferably adapted for use in an arrangement as illustrated in FIGS. 1 and 3 in which the bottle 60 is disposed above the chamber 18 having its open end opening downwardly. However, this is not necessary. The arrangement in FIG. 1 could be inverted and fluid provided to the inlet tube 35 via a dip tube or the bottle 60 may be collapsible.

While the invention has been described with reference to preferred embodiments, many variations and modifications will now occur to persons skilled in the art. For a definition of the invention, reference is made to the appended claims.

We claim:

1. A pump for dispensing liquid from a reservoir comprising:

piston chamber-forming member having a chamber disposed about an axis, the chamber having a diameter, a chamber wall, an inner end and an outer end, the inner end of the chamber in fluid communication with the reservoir, a one-way valve mechanism between the reservoir and the chamber permitting fluid flow through the inner end of said chamber, only from the reservoir to the chamber;

a piston-forming element received in the piston chamber-forming member axially slidable inwardly and outwardly therein, said piston-forming element having an axially extending hollow stem having a central passageway closed at an inner end and having an outlet proximate an outer end, an inner disc on the stem extending radially outwardly from the stem circumferentially thereabout, an outer disc on the stem spaced axially outwardly from the inner disc and extending radially outwardly from the stem circumferentially thereabout, an inlet located on the stem between the inner disc and the outer disc in communication with the passageway, the piston-forming element slidably received in the piston chamber-forming member for reciprocal axial inward and outward movement therein in a stroke of movement between an extended and a retracted position, the chamber having an axially inner chamber portion and an axially outer chamber portion, the inner chamber portion opening outwardly into the outer chamber portion, in movement between the extended position and the retracted position, the outer disc is maintained within the outer chamber portion, in movement between the extended position and the retracted position, the inner disc is within the inner chamber portion in an inwardmost portion of the stroke and within the outer chamber portion in an outwardmost portion of the stroke, in the outer chamber portion the chamber wall being cylindrical, when the outer disc is in the outer chamber portion the outer disc substantially preventing fluid flow in the outer chamber portion past the outer disc in an outward direction, when the inner disc is in the outer chamber portion the inner disc engaging the chamber wall to substantially prevent fluid flow in the outer chamber portion past the inner disc in an inward direction but the inner flexing disc elastically deforming away from the chamber wall of the outer chamber portion to permit fluid flow in the outer chamber portion past the inner disc in an outward direction, the inner chamber portion further comprising a spacing means for spacing the inner disk from the chamber wall, such that when the inner disc is in the inner chamber portion at least portions of the inner disc and the chamber wall are spaced radially to permit fluid flow in the inner chamber portion in both an inward direction and an outward direction past the inner disc.

2. A pump as claimed in claim 1 wherein a cycle of operation comprises moving in a retraction stroke from the extended position to the retracted position and moving in a withdrawal stroke from the retracted position to the extended position, in the withdrawal stroke while the inner disc is in the outer chamber portion a vacuum is created in the chamber between the inner disc and the one-way valve by which fluid is drawn from the reservoir past the one-way valve to between the inner disc and the one-way valve, in the withdrawal stroke while the inner disc is in the inner chamber portion vacuum is created in the chamber between the outer disc and the one-way valve by which fluid and/or air is drawn into between the one-way valve and the outer disc via the inlet, the passageway and the outlet, in the retraction stroke while the inner disc is in the outer chamber portion pressure is created in the chamber between the inner disc and the one-way valve by which fluid is discharged from between the inner disc and the one-way valve past the inner disc to between the inner disc and the outer disc and out the outlet via the inlet and passageway.

3. A pump as claimed in claim 2 wherein in the outer chamber portion the chamber wall is cylindrical, disposed about an axis and having a diameter.

4. A pump as claimed in claim 3 wherein the spacing means comprises a cylindrical extension of the chamber wall of the outer chamber portion but with at least one axially extending elongate rib member which extend radially inwardly, engagement between each rib member and the inner disc deflecting the inner disc radially inwardly out of sealing contact with adjacent portions of the chamber wall circumferentially adjacent the rib member.

5. A pump as claimed in claim 4 wherein the at least one axially extending elongate rib member comprising a plurality of circumferentially spaced rib members.

6. A pump as claimed in claim 3 wherein the spacing means comprises at least one axially extending bypass portion in which the chamber wall is located from the axis a distance greater than a diameter of the inner disc such that the inner disc does not engage the chamber wall over the bypass portion.

7. A pump as claimed in claim 3 wherein in the inner chamber portion the chamber wall is cylindrical about the axis having a diameter greater than a diameter of the outer chamber portion.

8. A pump as claimed in claim 3 wherein the spacing means comprises the chamber wall of the inner chamber portion being an oval having at least portions of the oval of a diameter greater than a diameter of the outer chamber portion.

9. A pump as claimed in claim 2 wherein in the cycle of operation includes a rest position for the piston-forming element when the pump is not in use, wherein in the rest position the inner disc and the outer disc are both in the outer chamber portion.

10. A pump as claimed in claim 9 including a spring member biasing the piston-forming element to the extended position.

11. A pump as claimed in claim 10 including outward stop member to limit outward movement of the piston-forming element by abutment between the piston-forming element and the piston-chamber-forming member.

12. A pump as claimed in claim 2 wherein the inner chamber portion is below the outer chamber portion.

13. A pump as claimed in claim 12 wherein the reservoir is above the outer chamber portion.

14. A pump as claimed in claim 1 wherein:

the piston-forming element being generally cylindrical in cross-section, each of the inner disc and outer disc being circular;

the inner disc having an elastically deformable edge portion for engagement with the chamber wall.

15. A pump as claimed in claim 1 wherein in a cycle of a first stroke of inward axial movement and a reciprocal second stroke of outward axial movement of the piston-forming element axially within the piston chamber-forming member, liquid is drawn from the reservoir past the one-way valve to between the one-way valve and the inner disc in one of said first and second strokes and liquid is pumped from between one-way valve and the inner disc past the inner disc and via the inlet to the passageway and out of the outlet, in the other of said first and second strokes.

16. A pump as claimed in claim 1 wherein the one-way valve mechanism comprises a inner cylinder on the piston chamber-forming member coaxial with the chamber, inward of the chamber and opening into the inner end of the chamber, the inner cylinder having a cylindrical wall, a diameter, an outer end opening into the inner end of the chamber and an inner end in communication with the reservoir, the diameter of the inner cylinder being different than the diameter of the chamber, the piston-forming element carrying a one-way valve disc on the stem inwardly from the inner disc, in movement between the extended position and the retracted position, the one-way valve disc is within the inner cylinder, when the inner disc is in the inner cylinder the one-way valve disc engaging the chamber wall to substantially prevent fluid flow in the cylinder past the one-way valve disc in an inward direction but the one-way valve disc elastically deforming away from the chamber wall of the cylinder to permit fluid flow in the cylinder portion past the one-way valve in an outward direction.

* * * * *